Figure 1:
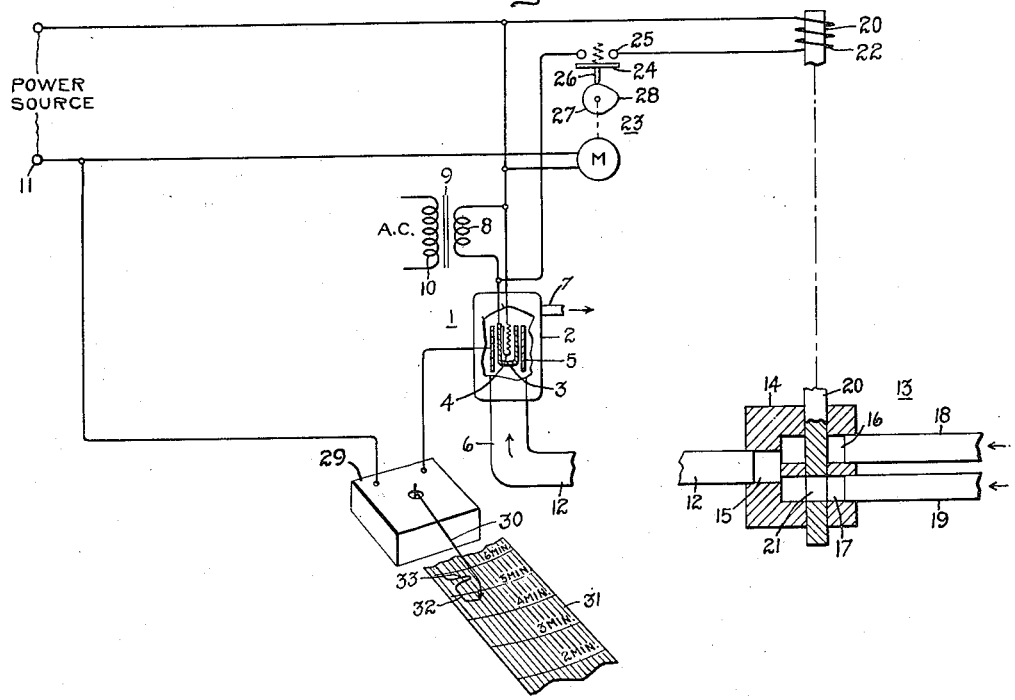

Dec. 18, 1951 W. C. WHITE 2,579,352
METHOD AND APPARATUS FOR THE QUANTITATIVE MEASUREMENT
OF IMPURITIES IN AN ATMOSPHERE
Filed April 28, 1950

Inventor:
William C. White,
by Paul G. Frank
His Attorney.

Patented Dec. 18, 1951

2,579,352

UNITED STATES PATENT OFFICE 2,579,352

METHOD AND APPARATUS FOR THE QUAN-
TITATIVE MEASUREMENT OF IMPURITIES
IN AN ATMOSPHERE

William C. White, Schenectady, N. Y., assignor to
General Electric Company, a corporation of
New York Application April 28, 1950, Serial No. 158,798

12 Claims. (Cl. 175—183)

1

This invention relates to improvements in electrical methods and apparatus for detecting certain substances or impurities in gases described and claimed in copending application Serial No. 754,657, filed June 14, 1947, by Chester W. Rice, now Patent No. 2,550,498, and assigned to the same assignee as the present invention.

In the above application there are described and claimed methods and apparatus for detecting substances such as certain gases, vapors, smokes and similar matter in an atmosphere by passing a sample of an atmosphere suspected of containing a concentration of the substance to be detected into an electrical discharge device under conditions which permit the substance to induce positive ion formation at a more positively charged heated electrode or anode, the positive ions so formed being collected by a negatively charged electrode to produce an indicating current which increases with the concentration of the substance. Devices of this type have been found to be qualitatively selective at atmospheric substances; that is, they respond only to certain types of substances such as the alkali metals or other substances having an ionization potential less than the electron work function of the electrodes, the halogens, or compounds of either. For certain substances such as the alkali metals and their compounds such ion formation apparently occurs by ionization of the substance itself when it comes into contact with the more positively charged heated electrode. For others such as the halogens and their compounds the substance appears to cause ion formation only in the presence of what might be called sensitizing materials such as the alkali metals or their compounds, and it further appears in this case that the sensitizing materials themselves are actually ionized to afford the desired positive ion current.

While the detector described above is very suitable for the qualitative detection of certain substances in an atmosphere, certain improvements are desirable to facilitate its use for the quantitative detection of such substances.

In the first place, the current through the device is extremely sensitive to variations in the temperature of the anode which in turn are caused by fluctuations in the line voltage. The changes in the current produced by these variations in temperature are, as a matter of fact, sometimes greater than the variations due to changes in the quantity of detected substance present. These variations in current, therefore, tend to mask the effects due to changes in the quantity of foreign substance being detected.

2

The net result is that the quantitative measurement of the amount of substances of the types described above is difficult.

When the detector as above described is exposed to the atmosphere containing the substance for an extended period of time there is some loss of sensitivity. This loss of sensitivity is particularly pronounced when the concentration of the substance is relatively high and, in general, is caused by contamination of the electrodes with the substance. The net result is that the positive ion current for a particular quantity of the foreign substance is indicative of the presence of a smaller amount than is truly present. The only way of restoring the sensitivity of the detector is to clean or replace the electrodes, or, if the contamination is not too pronounced, to allow pure air or gas to pass through the device for an extended period of time.

The anode current may also tend to vary when the device is running on pure air or gas if humidity, pressure, air or gas flow rate and the amount of activating materials are not maintained constant.

An object of this invention is to provide a means of quantitatively measuring certain substances in an atmosphere.

Another object of the present invention is to provide a means for the periodic renewal or regeneration of the sensitivity of a device as herein described.

A further object of the invention is to provide a means of producing a decided and quantitatively measurable change in current in the detector system when the detector is exposed to certain substances in an atmosphere.

A still further object of the invention is to provide a means of quantitatively measuring detectable substances under varying conditions of an atmosphere.

Figure 2:
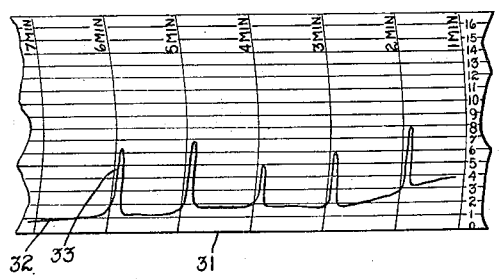

Other objects will become apparent from a consideration of the following description and the accompanying drawing in which Fig. 1 shows a typical arrangement for accomplishing the purposes of this invention and Fig. 2 shows a typical record produced by the present device.

It has been found that a very simple means may be provided for realizing the objects of this invention.

More particularly, it has been found that a detector of the type described may be made quantitatively sensitive to detectable substances by providing means for abruptly and periodically changing the flow of gas through the device from pure gas, including air, to the gas containing the substance to be detected and recording the variation in positive ion current on a current recorder. By such means the device is maintained in a sensitive condition, and the sudden exposure to the detectable substance produces a quantitative and measurable change in the production of positive ions. Furthermore, by the use of the so-called current recorder or graphic current meter which continuously records the positive ion current whether the detector be operating on pure gas or gas containing a substance to be detected, the positive ion current due to the presence of a detectable substance in the atmosphere being tested will appear as a measurable variation in the positive ion current record over and above current variations due to other causes.

In Fig. 1 of the drawing there is illustrated an embodiment of the present invention which demonstrates the basic principles thereof. The detector element 1 is of the type described in the above cited copending application. It may, for example, comprise an envelope 2, a positively charged electrode 3 which is heated by filament 4, a negative electrode 5, a gas or vapor inlet 6 and an outlet 7. Filament or heater wire 4 may be energized by any suitable means such as full line voltage or by the secondary winding 8 of a transformer 9 as shown, the transformer being energized by a source of power connected to its primary winding 10. Any suitable source of alternating or direct current power 11 may be employed to maintain a potential difference between electrodes 3 and 5.

The atmosphere to be tested is drawn between electrodes 3 and 5 by a suction pump, not shown, attached to conduit 7, from inlet 6 and conduit 12 and exhausts through conduit 7. Fixed to one end of conduit 12 is a selective gas or vapor switching mechanism 13. Switch device 13 comprises a casing 14 having an outlet hole 15 to receive conduit 12 and separate inlet holes 16 and 17 to receive conduit 18 for the atmosphere or source to be tested and conduit 19 for pure gas. Conduit 12 is preferably short in length. Mounted vertically in switch 13 is a solenoid plunger 20 which serves to block flow from conduit 18 or 19 into conduit 20 except when a hole 21 in rod 20 is aligned or is in registry with conduit 18 or 19 respectively. Plunger 20 is actuated by a solenoid coil 22, connected in circuit as shown. One terminal of the coil 22 is attached to a periodic switching device or mechanism 23 which serves to alternately open and close the electric circuit energizing coil 22. Switching device 23 comprises a spring loaded switch bar or plate 24 which serves to connect or disconnect terminals 25. Fixed to plate or bar 24 is a shaft 26 which rides on a rotating cam member 27. In order to impart motion to shaft 26 and actuate the switch, rotating member 27 has a raised portion 28 which forces shaft 26 upward for periods of time which depend upon the speed of rotation of member 27 and the length of raised portion 28. A motor M or any other suitable means is employed to rotate member 27 through a gear train or other speed control system, not shown, to provide a desired rate of rotation for member 27. By this arrangement the gas switching device 13 may be operated to introduce pure gas or air to detector 1 for a certain time and then to shut off the pure gas or air and introduce the gas, including air, plus impurity or foreign substance, to be tested for another selected period.

Connected in series with negative electrode 5 and the power source as shown is a current recorder or graphic current meter 29. In effect the current recorder 29 is a microammeter having a recording stylus 30 which continuously records any current flowing in the circuit on a moving graduated tape 31, which is driven by a clock mechanism, not shown.

A typical cycle of operation of the present device is as follows. Assuming that the solenoid plunger is in the position shown in Fig. 1 and the circuit is energized, air or pure gas is pumped through conduit 12 between electrodes 3 and 5 and through discharge conduit 7. Any change of current flowing between electrodes 3 and 5 due to the various atmospheric conditions such as purity of the gas or air, pressure, humidity, etc. is recorded on tape 31. Also recorded on tape 31 is any drift in the current due to variations in the anode temperature. The net result is that the line scribed on tape 31 represents the resultant current between the electrodes due to normal non-detecting conditions. Uncontaminated gas or air is allowed to run through the apparatus for a length of time necessary to allow the anode current to become relatively stabilized with respect to the air or gas. The speed of rotating member 27 and the size of the projection 28 on the member may be so adjusted that the solenoid coil 22 is unenergized for any desired period of time and then activated for a desired period. As the projection 28 contacts shaft 26, the latter rises to close the circuit to coil 22. In turn, plunger 20 is drawn upward, blocking passage of air from conduit 19 to conduit 12 and allowing the gas or vapor to be tested suddenly and abruptly to pass from conduit 18 through the now aligned hole 21 into passage 12 and through the detector device. The sudden influx of the test gas or vapor with its detectable substance causes an equally sudden and abrupt rise in the positive ion current flowing between electrodes 3 and 5. The rise in current is detected in recorder 29 and appears on tape 31 as a sudden jump in the current above the base line being recorded.

By comparing the current rise due to the test specimen with that produced by specimens of known contaminant content, the relative amount of substance in the gas or vapor being tested can be determined. In general, it is best to have the gas of unknown content pass through the device for from 5 to 10 seconds with the pure air or gas passage at least one minute in duration. A typical record obtained in detecting finely divided substances according to the present invention is shown in Fig. 2. The sheet is calibrated horizontally according to time period and vertically in terms of the magnitude of the positive ion current. The base line 32 varies typically as shown under the influence of changes in anode temperature and the condition of the air or pure gas passing through the device. However, when a gas or vapor, including air, containing a detectable substance is passed through the device for a relatively short time of from 5 to 10 seconds, as compared to air or pure gas passage for at least one minute, the positive ion current increases precipitately to produce lines such as 33 which give a quantitative measure of the substance present. By determining the amount of deflection of lines such as 33 produced by a gas from a standard source or a sample containing a known quantity of a particular detectable substance or substances, the exact amount of the substance or substances in any other sample may be determined by comparing the degree of deflection or the comparative height of lines 33 above the base line 32.

By this invention there is provided a simple arrangement for obtaining an accurate and quantitative measure of detectable substances in an atmosphere using a positive ion discharge device. While there has been described only one embodiment of the present invention, it will be understood that it is desired to protect all those changes which would occur to those skilled in the art and which do not depart from the scope and spirit of the present concept.

What I claim as new and desire to secure by Letters Patent of the United States is:

1. The method of quantitatively determining foreign substance in a gas atmosphere which comprises periodically introducing the gas between a pair of electrodes, applying a potential difference between the electrodes, measuring changes in the current between the electrodes due to the presence of said substance, and periodically introducing between the electrodes gas devoid of said substance.

2. The method as in claim 1 in which the substance is of a class having an ionization potential less than the electron work function of the more positive of said electrodes.

3. The method as in claim 1 in which the substance is of the class comprising the alkali metals and compounds thereof.

4. The method as in claim 1 in which the substance is of the class comprising the halogen elements and compounds thereof.

5. The method of quantitatively determining foreign substance in a gas atmosphere which comprises periodically introducing the gas into an electrical discharge device including a pair of electrodes, imposing an electric potential difference between the electrodes, detecting changes in the current between the electrodes due to the presence of said substance, periodically introducing into the device gas devoid of said substance, and comparing the changes in the current with those produced by a gas having a known content of the substance.

6. The method as in claim 5 in which the substance is of a class having an ionization potential less than the electron work function of the more positive of the electrodes.

7. The method as in claim 5 in which the substance is of the class comprising the alkali metals and compounds thereof.

8. The method as in claim 5 in which the substance is of the class comprising the halogen elements and compounds thereof.

9. Apparatus for measuring foreign substance in a gas atmosphere comprising an electrical discharge device including a pair of electrodes, means for periodically causing a flow of the gas containing said substance to pass between said electrodes, means for periodically causing the flow of other gas between said electrodes, and means for detecting changes in the current between said electrodes caused by the formation of positive ions in said device.

10. Apparatus as in claim 9 in which the substance is of a class having an ionization potential less than the electron work function of the more positive of said electrodes.

11. Apparatus as in claim 9 in which the substance is of the class comprising the alkali metals and compounds thereof.

12. Apparatus as in claim 9 in which the substance is of the class comprising the halogen elements and compounds thereof.

WILLIAM C. WHITE.

REFERENCES CITED

The following references are of record in the file of this patent:

UNITED STATES PATENTS

| Number | Name | Date |
| --- | --- | --- |
| 1,421,720 | Roberts | July 4, 1922 |
| 1,697,339 | Baker | Jan. 1, 1929 |
| 1,809,115 | Goddard | June 9, 1931 |
| 1,914,883 | Cottrell | June 20, 1933 |